Figure 1:
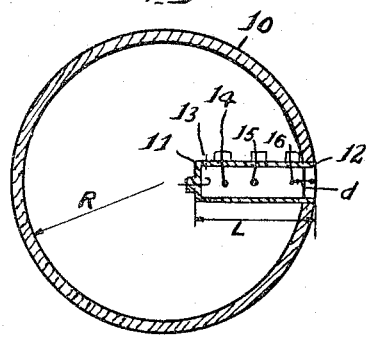

Inventors.
Charles M. Knop
Monte Ross
Robert B. Hankin
By Hofgren, Wegner, Allen, Stellman + McCord.
Attorneys.

United States Patent Office 3,317,826
Patented May 2, 1967

3,317,826
APPARATUS FOR MEASURING PLASMA
PARAMETERS ABOUT A VEHICLE
Charles M. Knop, Monte Ross, and Robert B. Hankin, Chicago, Ill., assignors, by mesne assignments, to HLF Corporation, Chicago, Ill., a corporation of California
Filed Feb. 26, 1963, Ser. No. 261,133
1 Claim. (Cl. 324—58)

This invention relates to an electrical measuring apparatus, and, more specifically, to an apparatus for measuring apparatus, and, more specifically, to an apparatus for measuring plasma characteristics and electrical impedances of bodies which have real and reactive components to transmitted radio frequency signals.

Antenna theory and practice in the past several decades have evolved practical means of measuring the loading factors on electrical radiating devices which propagate waves through the ether. With the advent of higher velocities of vehicles and particularly with vehicles travelling above the speed of sound, a problem has arisen of transmitting radio signals between such vehicles and other stations. In many instances when a vehicle reaches the high speeds which occur in space vehicles, the problems become very acute.

In self-contained vehicles, which do not depend upon ground installations for control information and which do not transmit radio signals while in the atmosphere, this problem may be ignored. However, in a vehicle such as a space capsule which utilizes ground control stations for control of its guidance systems and other functions, communication blackouts particularly upon re-entry are very serious.

One of the reasons for such communication blackouts is that a plasma sheath is established about the missile due to its high velocity as it re-enters the atmosphere. There is established a sonic shock wave about the missile, and, in addition, there are generated high temperatures, oftentimes in the neighborhood of thousands of degrees Kelvin which when combined with the shock wave produce the plasma or ionized air condition. Such a plasma interferes with the transmission of radio energy and prevents communication between the vehicle and other stations. The plasma appears to the radiator as a lossy and reflective material which prevents the signals from penetrating therethrough.

The disruptive effect of the plasma can be counteracted if the plasma frequency, $\omega_p$, and the collision frequency, $\nu_c$, are known.

It is, therefore, an object of this invention to provide an apparatus for measuring plasma parameters.

It is a further object of this invention to provide an apparatus easily incorporatable with a space vehicle for measuring plasma parameters.

It is another object of this invention to provide a system which measures plasma parameters and makes adjustments therefor to improve the transmission of radio frequency signals from a space vehicle.

Accordingly, one feature of the invention is to provide a plasma measuring apparatus for use with a vehicle for transporting the apparatus in a plasma, comprising means in the vehicle for generating a radio frequency signal, means coupled to the generating means for transmitting the signal to the plasma and means coupled to the transmitting means for measuring the impedance in the transmitting means.

It is a further feature of the invention to provide a waveguide in a space vehicle having one end flush with the outer surface of the vehicle and excited by a radio signal and wherein are located three probes at a predetermined space relationship with the end of the waveguide.

In is another feature of the invention to provide a measuring device for determining the parameters of a body into which radio frequency signals are fed.

Figure 2:
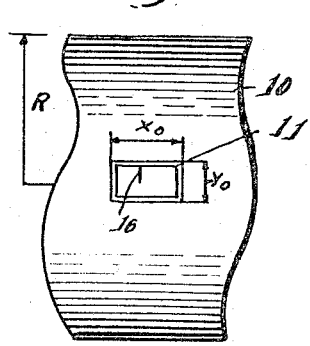
Figure 3:
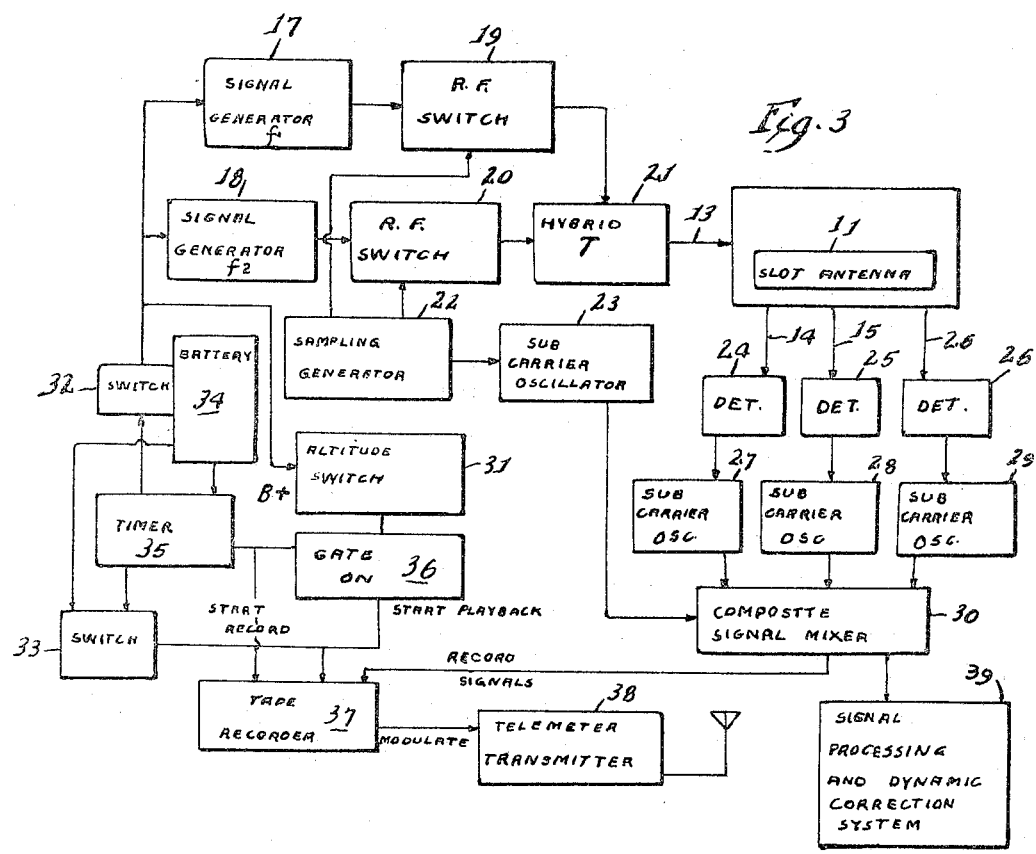

Further features and advantages of the invention will be apparent from the following specification and from the drawings, in which:

FIGURE 1 is a cross section of a space vehicle incorporating one embodiment of the invention;
FIGURE 2 is a side view of a portion of the vehicle on FIGURE 1; and
FIGURE 3 is a block diagram of the embodiment of the invention.

The vehicle shown in FIGURE 1 has a circular cross section and has an outer shell 10 representing the body thereof. Mounted within the body is a waveguide section 11 having an end 12 mounted flush with shell 10. Extending into the waveguide section is an exciting probe 13 coupling a signal generator (not shown) to radiate signals into the waveguide in a suitable manner, as the $TE_{01}$ mode of signal propagation. In addition, three probes 14, 15 and 16 extend into the waveguide section and are spaced a predetermined distance apart which, in one embodiment of the invention, corresponds to one-eighth of the guide wave length of the signal to be propagated in the waveguide and which are adapted to be coupled to detecting means (not shown). Probe 16 is spaced a distance, $d$, from the waveguide end 12.

FIGURE 2, a side view of the vehicle shell 10, shows the waveguide section 11 having two dimensions $x_0$ and $y_0$ which define the cross-sectional area of the waveguide intersection with the surface of the vehicle; the end of the waveguide should be flush with the vehicle surface. In a representative embodiment of the invention, the dimension $x_0$ was .900 inch, $y_0$ was .400 inch, and the length L represented in FIGURE 1 was approximately 6 inches. These dimensions are selected so that the waveguide end 12 is substantially planar for proper matching purposes at the selected frequency of operation. The radius R is large compared to the dimension $y_0$ to accomplish this end.

Although in the description of the embodiment of the invention shown, a simple rectangular cross section waveguide will be discussed, other types of radiating sections may be used such as a coaxial line excited in the TEM mode, or a circular slot excited by a $TE_{11}$ mode.

If the vehicle as shown in FIGURES 1 and 2 is in a stationary condition surrounded by air, moving below the speed of sound in air or beyond the atmosphere, no plasma sheath exists about it and the waveguide section 11 is matched to the impedance of the surrounding space and all of the radio waves propagated in the waveguide are transferred into the surrounding space. When such a vehicle enters the atmosphere at a high rate of speed, there is established about it a plasma which upsets the balanced condition of impedance matching and the waveguide section 11 includes the primary wave propagated down the waveguide and a wave reflected back from the end thereof. This establishes a standing wave within the waveguide section that is related to the plasma parameters.

When a hypersonic vehicle re-enters the earth's atmosphere, the plasma sheath formed interferes with the communication to the vehicle. To take measures to restore communications, it is first necessary to know parameters of this plasma sheath. The parameters of this sheath are its plasma frequency, $\omega_p$, its collision frequency $\nu_c$ and its thickness, $d$. These parameters must be known as a function of position, direction, and applied field strengths throughout the re-entry. With a knowledge of these parameters in conjunction with Maxwell's equations, the nature of the electromagnetic propagation that can occur in the sheath can be determined and measures to restore communication to the vehicle can be taken. The determination of these parameters can be done, both theoretically and experimentally.

The basic idea in the measurement of the plasma parameters is to obtain an explicit relationship, $Z_{in}(\omega_p, \nu_c)$ for the input impedance of a slot antenna in terms of these parameters. A slot antenna is preferred since it can be flush mounted on the vehicle surface and will not perturb the plasma. The impedance presented to this slot by the plasma sheath-air environment will depend on the nature of the variation of $\omega_p$, $\nu_c$ in the sheath, the shape of the sheath and the vehicle, the frequency of operation, the manner of excitation of the slot and the thickness of the sheath.

The choice of slot and excitation should be such that the relationship $Z_{in}(\omega_p, \nu_c)$ cannot only be defined, but can readily be obtained. A simple slot-excitation configuration is a thin rectangular slot excited by the dominant $TE_{01}$ mode of a rectangular waveguide, as depicted in FIGURE 1. The $Z_{in}$ for this slot has been obtained for the case of a very lossy plasma. Other simple types would be an annular slot excited by a TEM coaxial line mode, and a circular slot excited by the $TE_{11}$ mode of a circular waveguide.

Having decided on the slot antenna-excitation structure, the next factor to be considered is the adoption of a realistic model of the plasma sheath.

In general, the plasma sheath will have an $\omega_p$ and $\nu_c$ which depend on position (non-homogeneous), direction (anisotropic), and applied field strength (nonlinear). The shape and thickness of the sheath depend on the size and shape of the vehicle and its velocity. If one considers bodies of long, smooth shape, the anisotropy can generally be neglected. If the applied field at the antenna location are small enough, the nonlinearities can also be ignored. This leaves only the case of a non-homogeneous plasma sheath to be considered. Theoretical work indicates that the variations of the plasma frequency and collision frequency with respect to radial distance out from the body give rise to a dielectric constant which varies almost linearly. It can be shown theoretically that, during a large portion of the reentry period, the collision frequency and plasma frequency combination can give dielectric constants having very high negative real parts, which are very lossy, and which drop rapidly away from the body so that the plasma sheath can be approximately replaced by an equivalent uniform plasma slab. This slab can further be approximated by a semi-infinite medium if the sheath is lossy enough and the thickness, $d$, can be ignored.

The axial variation of plasma frequency and collision frequency, will, in general, be small compared to the radial variation, and, in the first approximation, may be neglected.

Having adopted the uniform sheath model, which is a good approximation to reality, the next problem is to find the input impedance presented by such a sheath.

This is, in general, a boundary value problem which involves three regions: the exciting waveguide, the sheath, and the region exterior to the sheath. However, an approximate expression for the input impedance can be obtained if the shape of the exciting field across the slot is taken as known. For narrow slots, the assumption of a sinusoidal field variation across a thin rectangular slot is a good one which eliminates the waveguide region and reduces the problem to two regions.

It can be shown, that for the case of a thin rectangular slot excited by a $TE_{01}$ mode of a rectangular waveguide flush with the surface of an infinite metal plane coated with a lossy uniform dielectric (including the plasma as a special case), the explicit relationship for the approximate $Z_{in}$ in terms of the dielectric constant (and in terms of plasma frequency and collision frequency for the plasma case) is:

$$z_{in} = \frac{Z_{in}}{Z_{TE_{01}}} = \frac{\lambda v}{\lambda gk} \frac{1}{\sqrt{\frac{v}{\epsilon_r}}} \equiv r_1 + ix_1 \quad (1)$$

or in terms of admittance:

$$y_{in} = \frac{1}{z_{in}} = \frac{\lambda gk}{\lambda v}\sqrt{\frac{v}{\epsilon_r}} \equiv g_1 + ib_1 = \frac{\lambda gk}{\lambda v} N \quad (2)$$

where $$\overset{v}{\epsilon}_t = \epsilon_r' - j\epsilon_r'' \text{ and}$$

$z_{in}$ = normalized input impedance of slot = $1/y_{in}$
$\lambda v$ = free space wavelength of wave exciting slot.
$\lambda v$ = free space wavelength of wave exciting slot
$\lambda gk$ = guide wavelength of $TE_{01}$ mode in rectangular guide filled with lossy material of dielectric constant K
$\mu v$ = permeability of free space
$\epsilon v$ = permittivity of free space $$N = \sqrt{\frac{v}{\epsilon_r}} = \text{index of refraction of plasma sheath}$$

Solving (2) for $\epsilon_r'$ and $\epsilon_r''$ in terms of the measured conductance, $g_1$, and susceptance, $b_1$, components of $y_{in}$ gives:

$$\epsilon_r' = \left(\frac{\lambda v}{\lambda gk}\right)^2 (g_1^2 - b_1^2) \quad (4)$$

$$\epsilon_r'' = -2\left(\frac{\lambda v}{\lambda gk}\right)^2 g_1 b_1 \quad (5)$$

Then since for the lossy plasma sheath $\epsilon_r'$ and $\epsilon_r''$ are related to $\omega_p$ and $\nu_c$ by:

$$\epsilon_r' = 1 - \frac{(\omega_p/\omega)^2}{1 + (\nu_c/\omega)^2} \quad (6)$$

$$\epsilon_r'' = \frac{(\nu_c/\omega)(\omega_p/\omega)^2}{1 + (\nu_c/\omega)^2} \quad (7)$$

where
$\omega_p$ = plasma frequency $$\omega_p^2 = \frac{ne^2}{\epsilon_v m}$$

$\nu_c$ = collision frequency
$e$ = electron charge = $1.60 \cdot 10^{-19}$ coulombs
$m$ = mass of electrons = $9.11 \cdot 10^{-31}$ kgs.
$\omega = 2\pi f$, $f$ = operating frequency
$n$ = electron density, electrons/meter$^3$ gives from (4) and (5) for $\nu_c$ and $\omega_p$ in terms of $\epsilon_r'$ and $\epsilon_r''$:

$$\frac{\nu_c}{\omega} = \frac{\epsilon_r''}{1 - \epsilon} \quad (8)$$

$$\left(\frac{\omega_p}{\omega}\right)^2 = (1 - \epsilon_r')\left[1 + \left(\frac{\epsilon_r''}{1 - \epsilon_r'}\right)^2\right] \quad (9)$$

Thus, $\omega_p$ and $\nu_c$ can be determined from $\epsilon_r'$ and $\epsilon_r''$ which in turn are determined by the measured quantities $\lambda v$, $\lambda gk$, $g_1$, and $b_1$.

Thus, it is possible to determine reentry plasma parameters for that portion of reentry where the plasma sheath is very lossy, which, for vehicles reentering the atmosphere, can be a substantial part of the reentry period. Further, since the sheath is so lossy, the above will hold independent of body shape if the sheath covers the whole slot, since little energy gets through it, and any change in body curvature and exterior shape will not influence the measured input impedance significantly.

The method used to measure the input impedance in the disclosed embodiment of the invention consists of using three fixed probes which slightly penetrate into the exciting waveguide and are positioned along it very accurately. The output of the individual probes is rectified, and relative power output is measured. The output of the probes is sampled, recorded, and retransmitted after the plasma sheath no longer exists about the reentering vehicle.

The rectified power outputs of the three identical probes, $M_1$, $M_2$ and $M_3$, in conjunction with known distance, $d$, from the first probe to the plane-dielectric innerface enables one to compute the magnitude and angle of the reflection factor by use of the following formulas:

Magnitude of reflection coefficient; $|\Gamma| = \dfrac{1-\sqrt{1-y}}{\sqrt{y}}$  (10)

and angle of reflection coefficient;

$$\Theta = -\delta\beta_x d + \tfrac{1}{2}\left[\cos^{-1}\left(\dfrac{b}{\sqrt{a^2+b^2}}\right)\right] \quad (11)$$

where $y =$ $$\dfrac{(m_2-1)^2 + (m_3-1)^2 + (m_3-m_2)^2 + 2(m_2-1)(m_3-m_2)\cos\pi\delta - 2(m_3-1)^2 \dfrac{\cos\pi}{2}\delta}{\left[(1+m_3)\sin\dfrac{\pi}{2}\delta - m_2 \sin\pi\delta\right]^2}$$

$\delta = f/f_x$  (13)

$m_2 = \dfrac{M_2}{M_1}$  (14)

$m_3 = \dfrac{M_3}{M_1}$  (15)

$a = (m_2-1)\cos\pi\delta - (m_3-1)\cos\dfrac{\pi}{2}\delta + (m_3-m_2)$  (16)

$b = (m_2-1)\sin\pi\delta - (m_3-1)\sin\dfrac{\pi}{2}\delta$  (17)

where
$f_x$ is the frequency where probes are ⅛ guide wavelength and $f$ is the measurement frequency.

Then by a Smith Chart or calculations, $$Z_\text{in} = \dfrac{1+\Gamma_r}{1-\Gamma_r}, \quad y_\text{in} = \dfrac{1-\Gamma_r}{1+\Gamma_r} \quad (18)$$

the normalized input admittance (or impedance) can be found. Use of Equations 4, 5, 8, and 9 will give the plasma parameters.

In the event that $g_1$ and $b_1$ are small, $b_1$ may be difficult to determine, and, in this event, two different frequencies can be used to determine both the collision frequency and the plasma frequency. The use of two frequencies may also serve as a double-check on the measured values of the plasma parameters since they are independent of frequency. One set of such frequencies might be 2 kncm. and 3 kncm.

Thus, for a given frequency, a knowledge of the probe's outputs for a known probe spacing is sufficient to determine the input admittance, $y_\text{in}$.

FIGURE 3 is a block diagram of a plasma parameter measuring device usable in conjunction with the wave guide section shown in FIGURES 1 and 2. It incorporates first and second signal generators 17 and 18 coupled through respective RF switches 19, 20 to a hybird T coupler 21. Half of each signal generated by the generators 17, 18 are fed through the hybrid coupler to the slot antenna, and no signal is reflected back into the generators. A sampling generator 22 actuates a sub-carrier oscillator 23, and, at the same time, alternately closes the RF switches 19 and 20 to couple the output of the signal generators to the slot antenna 11.

When a standing wave exists in the slot antenna, signals are developed at the output probes 14, 15 and 16 and coupled to respective detectors 24, 25 and 26 which, in turn, supply outputs to three sub-carrier oscillators 27, 28 and 29. The output of all of the sub-carrier oscillators is fed to the composite signal mixer 30 for further processing.

In one embodiment of the invention, it is desirable to utilize the invention to measure the parameters of plasma during the re-entry of the vehicle and to record the measurements for retransmission at a later time when the plasma has ceased to exist. To this end, there is supplied an altitude switch 31, switches 32 and 33, a battery 34, timer 35, gate "on" circuit 36, tape recorder 37, and a telemeter transmitter 38.

The device operates as follows: The signal generators develop continuous signals which are alternately fed through the RF switches 19 and 20 and hybrid coupler 21 to the exciting probe within the slotted antenna. Signals are propagated along the wave guide and encounter the plasma at the outer end 12. When the plasma exists, a wave reflected back into the waveguide establishing a standing wave within the waveguide. Probes 14, 15 and 16 measure the field intensity at the specific points, and, since they are spaced one-eighth of a guide wavelength apart, they also indicate the phase relationship of the signals. Detectors 24, 25 and 26 develop outputs which are coupled to the sub-carrier oscillators 27, 28 and 29. The outputs are derived alternately from the two signal frequencies, and the two sets of three outputs are sufficient to establish the plasma parameters. Experience has shown that, above 250,000 feet, plasma which exists about a vehicle on its re-entry path does not provide a major problem. Therefore, altitude switch 31 is calibrated to be actuated at approximately 250,000 feet. It is to be understood that such a setting is optional, depending upon the information to be determined. Gate "on" circuit 36 actuates the tape recorder, and it begins to record signals received from composite mixer 30.

Since the power supply systems in vehicles such as this type are limited due to weight requirements, the entire system is switched on by switch 32 which starts the timer 35 and applies potential throughout the circuit. After a predetermined time, timer 35 actuates the tape recorder to its high speed playback operation. At that time, which is after the vehicle has slowed down to a point where plasma ceases to be a problem about the vehicle, the information is telemetered via transmitter 38 to a ground station. With this information it is possible to calculate the plasma parameters which existed during the re-entry flight.

In the event that it is desirable to make dynamic corrections within the vehicle itself during the re-entry, during which time the plasma exists, signal processing and dynamic correction system 39 has been provided to receive a signal from the composite signal mixer 30. It thus becomes possible to use this information to effect changes which will permit transmission or reception of signals through the plasma. For example, an automatic matching network could be provided to match the waveguide and antenna to the plasma.

While we have shown and described certain embodiments of our invention, it is to be understood that it is capable of many modifications. Changes, therefore, in the construction and arrangement may be made without departing from the spirit and scope of the invention as disclosed in the appended claim.

We claim:

Apparatus for measuring changes in plasma parameters about a vehicle comprising: means in said vehicle for generating a first signal; means in said vehicle for generating a second signal having a frequency different from that of the first signal; a signal transmitting member having one end flush with the outer surface of said vehicle and in contact with said plasma; a switching network coupling said first and second generating means to alternately couple said signals to said transmitting member; means, including three probes extending into and spaced along said member at distances equal to one-eighth of a guide wavelength of said first signal, for measuring the standing wave in said waveguide; and means for storing and transmitting said measurements to a point of use.

References Cited by the Examiner

UNITED STATES PATENTS

| | | | |
|---|---|---|---|
| 2,456,800 | 12/1948 | Taylor et al. | 324—58 X |
| 2,522,563 | 9/1953 | Blitz | 324—58 |
| 2,539,680 | 1/1953 | Wehner | 343—789 |
| 2,639,317 | 5/1953 | Bennett | 324—58 |
| 3,176,228 | 3/1965 | Phillips et al. | 343—705 |
| 3,208,068 | 9/1965 | Hoffman | 343—705 |

OTHER REFERENCES

Electronics (I), vol. 34, No. 2, January 13, 1961, pp. 88–92, "Measuring Antenna Impedance in the Ionosphere."

WALTER L. CARLSON, *Primary Examiner.*

A. E. RICHMOND, P. F. WILLE, *Assistant Examiners.*